United States Patent [19]
Robbins, III

[11] Patent Number: 6,029,859
[45] Date of Patent: Feb. 29, 2000

[54] MEASURING DISPENSING CANISTER

[76] Inventor: Edward S. Robbins, III, 128 Hazelwood La., Florence, Ala. 35630

[21] Appl. No.: 09/128,519

[22] Filed: Aug. 3, 1998

Related U.S. Application Data

[63] Continuation-in-part of application No. 29/080,070, Nov. 26, 1997.

[51] Int. Cl.⁷ ..................................................... B67D 5/38
[52] U.S. Cl. .......................... 222/158; 222/456; 222/454; 141/326; 141/327
[58] Field of Search ................................... 222/157, 158, 222/454, 481, 456, 441; 141/326, 327

[56] References Cited

U.S. PATENT DOCUMENTS

| | | | |
|---|---|---|---|
| 844,686 | 2/1907 | Marschall. | |
| 2,538,336 | 1/1951 | Smith | 222/455 |
| 2,819,000 | 1/1958 | Boguss et al. | 222/454 |
| 3,401,840 | 9/1968 | McConnell et al. | 222/153 |
| 4,171,075 | 10/1979 | Gangwisch | 222/456 |
| 4,637,529 | 1/1987 | Knight | 222/424.5 |
| 4,782,984 | 11/1988 | Su | 222/456 |
| 5,165,576 | 11/1992 | Hicherson | 222/158 |
| 5,518,152 | 5/1996 | Burcham et al. | 222/452 |

FOREIGN PATENT DOCUMENTS

| | | | |
|---|---|---|---|
| 2710639 | 9/1978 | Germany | 222/456 |
| 222549 | 2/1925 | United Kingdom | 221/98 |

*Primary Examiner*—Henry J. Recla
*Assistant Examiner*—Khon Huynh
*Attorney, Agent, or Firm*—Locke Reynolds LLP

[57] ABSTRACT

A canister for dispensing a measured volume of material, including a container having a generally planar bottom surface, a partition disposed with the container and attached to the bottom surface to define a storage compartment and a measuring dispensing compartment within the container so that a passage is defined generally above and between the storage compartment and the measuring dispensing compartment. The container includes a handle portion which can have an indented portion disposed proximate to the storage compartment. The storage compartment defines an opening disposed generally opposing the bottom surface, and the measuring dispensing compartment includes volumetric indicia and defines a dispensing orifice disposed generally proximate to the bottom surface. At least a portion of the container proximate to the measuring dispensing compartment is formed of a visually translucent material. A lid is provided for removable covering attachment to the container at the opening, and a closure is provided for removable covering attachment to the container at the dispensing orifice.

13 Claims, 5 Drawing Sheets

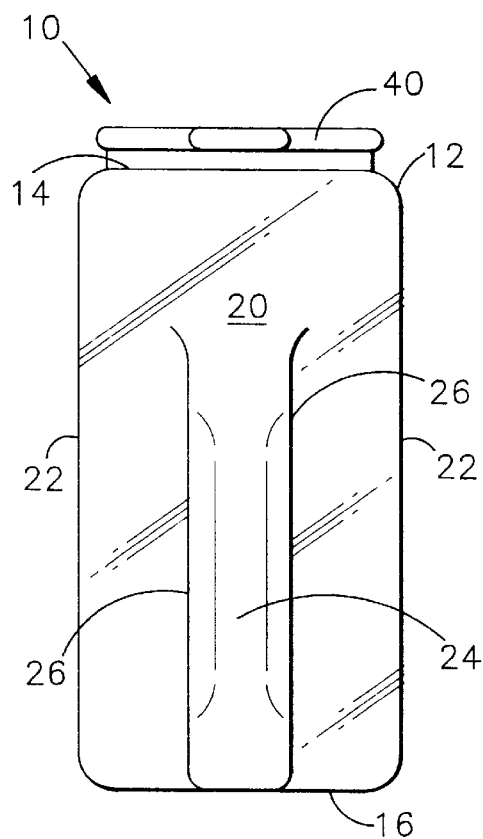
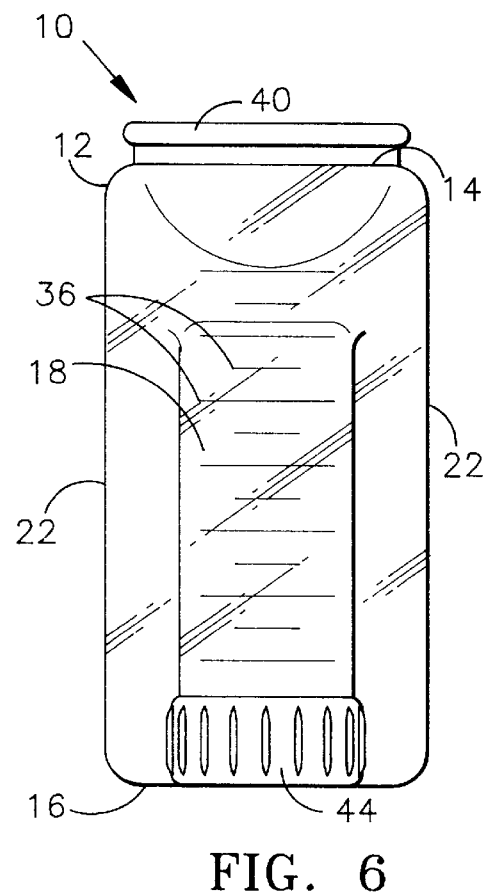
FIG. 5
FIG. 6

MEASURING DISPENSING CANISTER

CROSS-REFERENCE TO RELATED APPLICATION

This is a continuation-in-part of applicant's prior co-pending application Ser. No. 29/080,070, filed Nov. 26, 1997.

BACKGROUND OF THE INVENTION

1. Field of the Invention

The present invention generally relates to canisters for the storage and dispensing of liquids and particulate solids, and more particularly concerns canisters of the type that are capable of dispensing stored liquid or particulate solid in a measured amount that can be selected by the user.

2. Description of the Prior Art

There are presently available a number of canisters that can be used to store liquids or particulate solids and, in addition, are capable of dispensing a portion of the liquid or particulate solid. The array of such devices includes canisters where the user can select a volume, up to a specified maximum volume, of a particulate solid to be dispensed through a closure flap disposed approximate to the bottom of the canister, such as that described in U.S. Pat. No. 2,819,000. Further, there are presently available canisters where a single, predetermined volume of a particulate solid can be dispensed, such as that described in U.S. Pat. No. 4,637,529, and, in addition, canisters where the user can select one of a number of predetermined volumes of a particulate solid to be dispensed, such as that described in U.S. Pat. No. 4,782,984.

Despite the availability of such canisters, there exists a need in the art for a measuring dispensing canister that is capable of conveniently storing any of a wide variety of liquids or particulate solids, that is capable of dispensing a measured portion of the liquid or particulate solid in a controlled manner, with the volume of material to be dispensed selected by the user to be any volume up to a maximum volume.

SUMMARY OF THE INVENTION

In order to aid in the understanding of the present invention, it can be stated in essentially summary form that it is directed to a measuring dispensing canister that is capable of storing any of a variety of liquids or particulate solids and dispensing therefrom in a controlled manner a measured portion of the liquid or particulate solid, the measured volume selected by the user to be any volume up to a maximum volume.

More specifically, a measuring canister includes a container having a top surface, a generally planar bottom surface, a front surface, a rear surface, and a pair of generally opposing sides. An indented handle is formed along the rear surface. A partition of the container, defined generally by two adjacent wall portions disposed generally normal to the bottom surface, divides the interior of the container to form a storage compartment and a measuring dispensing compartment, and defines a passage generally above and between the storage compartment and measuring dispensing compartment. The rear surface is disposed proximate to and forms a wall of the storage compartment while the front surface is disposed proximate to and forms a wall of the measuring dispensing compartment. At least a portion of the container forming the measuring dispensing compartment is formed of a visually translucent material. Indicia are disposed on the container at the front surface, proximate to the measuring dispensing compartment, for indicating the volume of contents with the measuring dispensing compartment.

One of the wall portions forming the partition and the wall portion forming the front surface are preferable integral and form a downwardly directed tubular segment defining the measuring dispensing compartment. The lower end of the measuring dispensing compartment terminates in a dispensing orifice which is downwardly directed. A closure is provided for attachment to a first threaded portion surrounding the dispensing orifice defined by the bottom surface at the measuring dispensing compartment. The closure defines a second threaded portion capable of threaded engagement with the first threaded portion, so that the closure can be removably attached in threaded engagement to the container. Alternatively, the closure may be removably attached surrounding the dispensing orifice using a snap-on attachment. A resilient lid is provided, and the dimensions of an opening defined by the top surface of the measuring canister are chosen so that the lid can be removably attached to the container, in the manner of a snap-on attachment.

In use, liquid or particulate material is placed within the storage compartment and the lid is snapped into place. To dispense a portion of the liquid or particulate solid, the present invention is tilted using the handle, permitting liquid or particulate material to flow over the partition and through the passage from the storage compartment into the measuring dispensing compartment. After placing the present invention in an upright position, the user can inspect the measuring dispensing compartment and compare the volume of liquid or particulate solid present therein with the volume desired to be dispensed, referring to the indicia. In the event that insufficient liquid or particulate material is present within the measuring dispensing compartment the invention can once again be tilted allowing additional material to pass from the storage compartment through the passage and into the measuring dispensing compartment. Conversely, should the volume of liquid or particulate material present within the measuring dispensing compartment be greater than the volume desired to be dispensed, the present invention can be tilted in the opposite sense allowing liquid or particulate material to pass from the measuring dispensing compartment through the passage and return into the storage compartment. When the desired volume of liquid or particulate material is present within the measuring dispensing compartment, the closure can be removed so that the material present with the measuring dispensing compartment is dispensed from the present invention through the dispensing orifice, without affecting material within the storage compartment.

Further features and advantages of the present invention will be apparent from the study of the following portion of the specification, the claims, and the attached drawings.

BRIEF DESCRIPTION OF THE DRAWINGS

FIG. 5 is a rear elevation view of a measuring dispensing canister representing the present invention.

FIG. 6 is a front elevation view of a measuring dispensing canister representing the present invention.

DETAILED DESCRIPTION OF THE PREFERRED EMBODIMENTS

Figure 1:
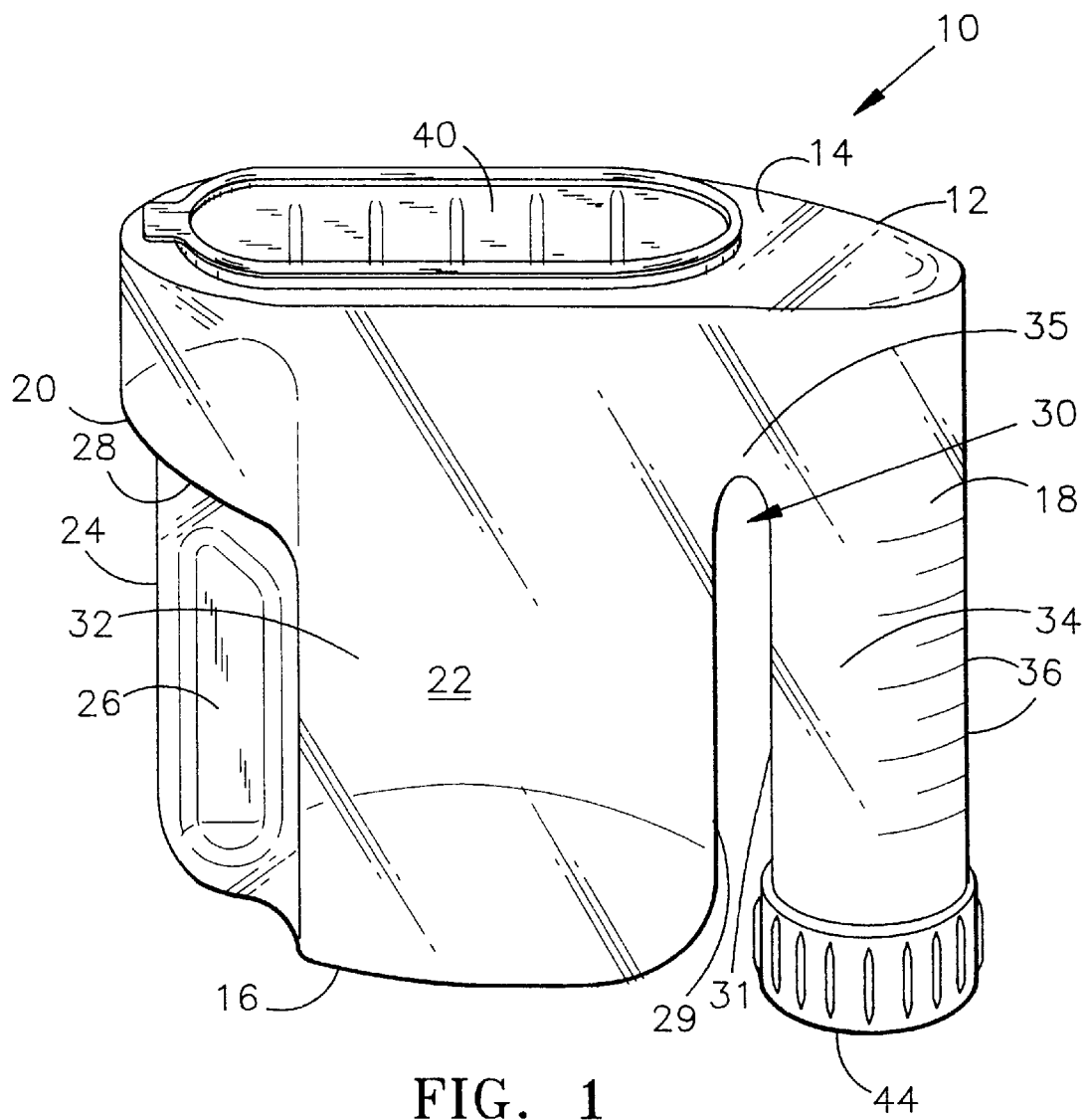
FIG. 1 is a perspective view of a measuring dispensing canister representing the present invention.
Figure 2:
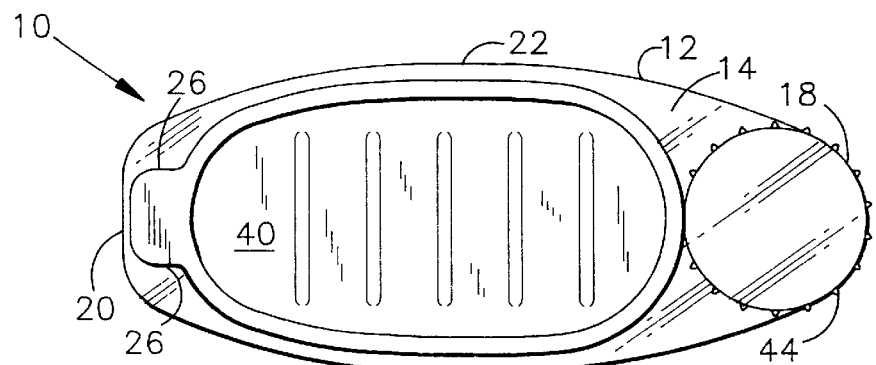
FIG. 2 is a top plan view of a measuring dispensing canister representing the present invention.
Figure 3:
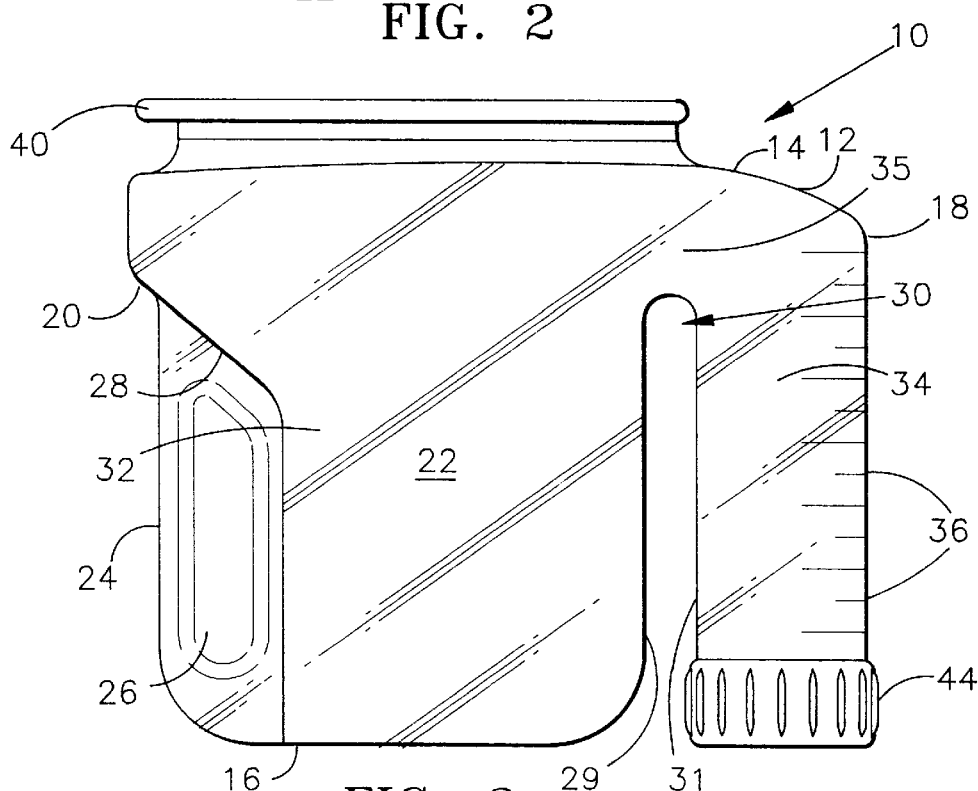
FIG. 3 is a side elevation view of a measuring dispensing canister representing the present invention.
Figure 4:
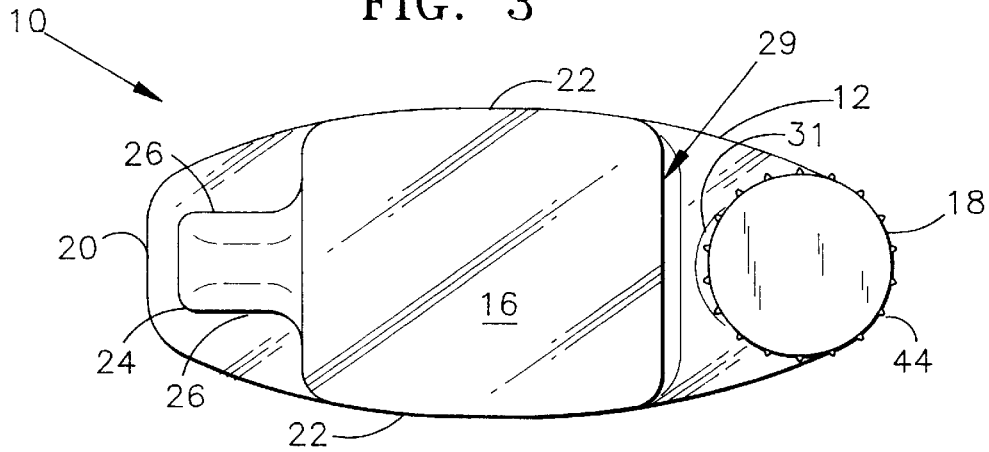
FIG. 4 is a bottom view of a measuring dispensing canister representing the present invention.
Figure 7:
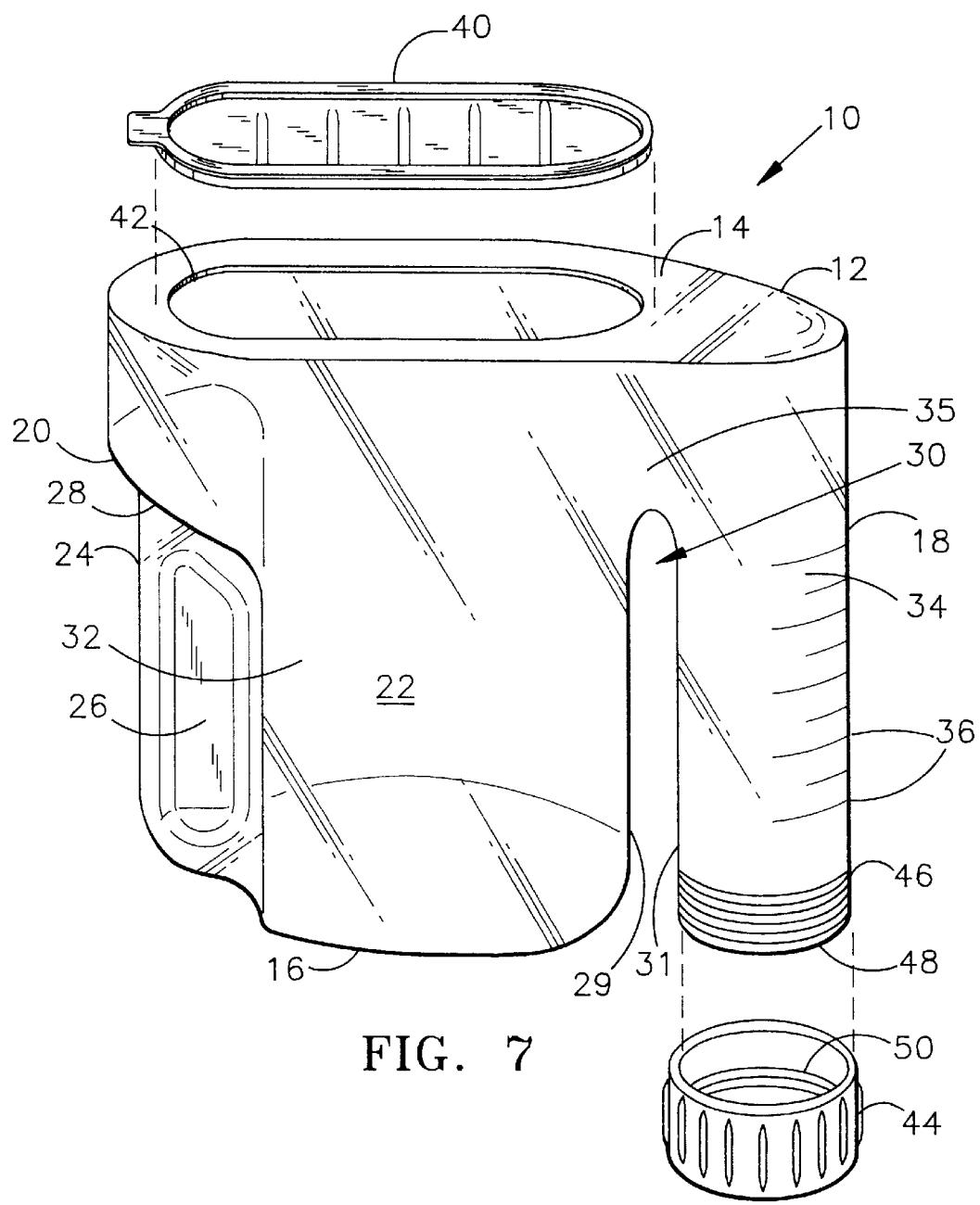
FIG. 7 is an exploded perspective view of a measuring dispensing canister representing the present invention.

The following portion of the specification, taken in conjunction with the drawings, sets forth the preferred embodiments of the present invention. The embodiments of the invention disclosed herein are the best mode contemplated by the inventor for carrying out the invention in a commercial environment, although it should be understood that various modifications can be accomplished within the parameters of the present invention.

Referring now to the drawings for a detailed description of the present invention, reference is made to FIGS. 1–7, generally depicting measuring dispensing canister 10 of the present invention, showing container 12 having top surface 14, generally planar bottom surface 16, front surface 18, rear surface 20, and sides 22. Indented handle 24 is formed along rear surface 20, and has indented side portions 26 and indented top portions 28. Container 12 can be formed of a resilient material such as any of a number of commonly available plastics. A partition 30 of the canister 10 is defined by two generally adjacent wall portions 29 and 31 disposed generally normal to bottom surface 16 that divides the interior of container 12 so as to form storage compartment 32 and measuring dispensing compartment 34, and defines passage 35 generally above and between storage compartment 32 and measuring dispensing compartment 34. The rear surface 20 is disposed proximate to and forms a part of the storage compartment 32. The front surface 18 is disposed proximate to, and together with wall portion 31, forms the measuring dispensing compartment 34. At least a portion of container 12 forming the measuring dispensing compartment 34 is formed of a visually translucent material, although, as depicted, container 12 can be formed entirely of a visually translucent material. Indicia 36 are disposed on container 12 at front surface 18, proximate to measuring dispensing compartment 34 for indicating the volume of contents within measuring dispensing compartment 34.

Depicted in FIGS. 1–3 and 5–7 is resilient lid 40. The dimensions of opening 42 defined by top surface 14 are chosen so that lid 40 can be removably attached to container 12 by aligning lid 40 with opening 42 and pressing lid 40 towards container 12, thereby forcing lid 40 into opening 42 in the manner of a snap-on attachment and forming a seal between lid 40 and container 12.

Illustrated in FIGS. 1 and 3–7 is closure 44. First threaded portion 46 is disposed surrounding dispensing orifice 48 defined by bottom surface 16 at measuring dispensing compartment 34. Closure 44 defines second threaded portion 50 capable of threaded engagement with first threaded portion 46. In this way, closure 44 can be removably attached in threaded engagement to container 12.

Figure 8:
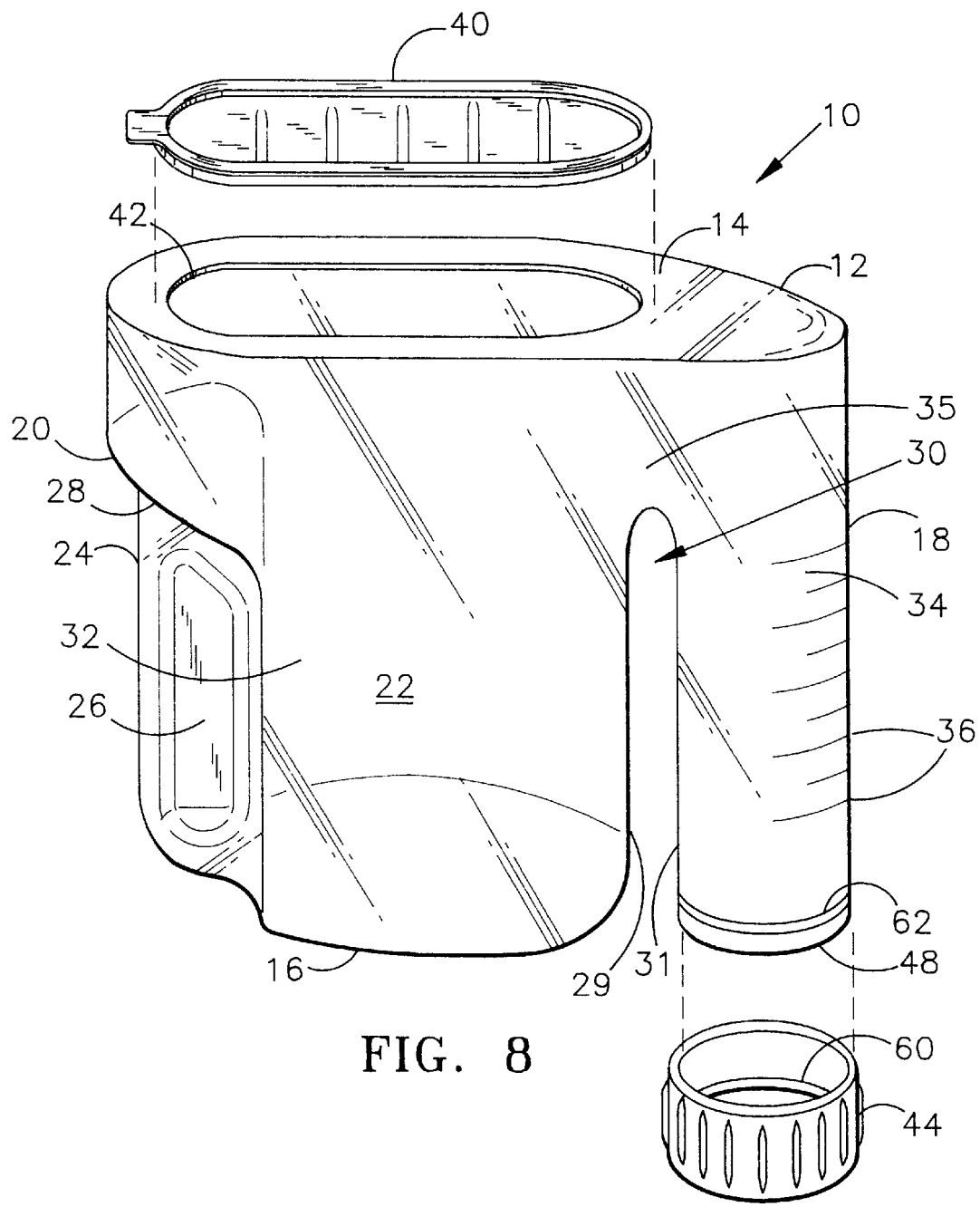
FIG. 8 is an exploded perspective view of a measuring dispensing canister representing a second embodiment of the present invention.

It will of course be recognized that lid 40 and closure 44 can each be removably attached to container 12 in a variety of other manners well known in the art. In a second embodiment of the present invention, depicted in FIG. 8, closure 44 defines first snap-on portion 60. Second snap-on portion 62 is disposed surrounding dispensing orifice 48, and is capable of engagement with first snap-on portion 60, whereby closure 44 may be removably attached to container 12.

In use, liquid or particulate material is placed in storage compartment 22, and lid 40 is oriented proximate to opening 42 and snapped into place. Should it be desired to dispense a portion of the liquid or particulate solid, the present invention can be tilted using handle 24, thereby permitting liquid or particulate material to flow over partition 30 through passage 35 from storage compartment 32 into measuring dispensing compartment 34. It will be appreciated that any volume of liquid or particulate solid, up to the volume of the measuring dispensing compartment 34, can be transferred from storage compartment 32 into measuring dispensing compartment 34 for dispensing, so that the user of the present invention is not limited to dispensing a few discrete pre-selected volumes of liquid or particulate material. When the user believes that the volume of liquid or particulate material that is desired to be dispensed has been transferred from measuring dispensing compartment 34, the present invention is placed in an upright position. Thereafter, the user can inspect measuring dispensing compartment 34 and compare the volume of liquid or particulate material present in measuring dispensing compartment 34 with that volume of liquid or particulate material desired to be dispensed, referring to indicia 36. Observation of the volume of liquid or particulate material present in measuring dispensing compartment 34 is facilitated by the formation of at least a portion of container 12 proximate to measuring dispensing compartment 34 of a visually translucent material. In the event that insufficient liquid or particulate material is present in measuring dispensing compartment 34, the present invention can once again be tilted, allowing additional liquid or particulate material to pass from storage compartment 32 through passage 35 into measuring dispensing compartment 34. On the other hand, should the volume of liquid or particulate material present in measuring dispensing compartment 34 be greater than the volume that the user desires to dispense, the present invention can be tilted in the opposite sense, allowing liquid or particulate material to pass from measuring dispensing compartment 34 through passage 35, thereby returning liquid or particulate material into storage compartment 32.

When the desired volume of liquid or particulate material is present in measuring dispensing compartment 34, closure 44 is removed so that liquid or particulate material present within measuring dispensing compartment 34 is dispensed from the present invention through dispensing orifice 48, without effecting liquid or particulate material in storage compartment 32. It will be appreciated that dispensing of liquid or particulate material from the present invention is thereby performed in a controlled manner.

The present invention, having been described in its preferred embodiment and defined by the following claims, is susceptible to numerous modifications and embodiments within the ability of those skilled in the art and without the exercise of the inventive faculty.

What is claimed:

1. A canister for dispensing a measured volume of a material, comprising: a container having a generally planar bottom surface, a pair of generally opposing sides, and two adjacent wall portions disposed adjacent to each other and generally normal to the bottom surface defining a partition of the container into a storage compartment and a measuring dispensing compartment, the partition having an upper margin within the container so that a passage is defined generally above and between the storage compartment and the measuring dispensing compartment, the storage compartment defining an opening disposed generally opposing the bottom surface, and the measuring dispensing compartment defining a dispensing orifice disposed generally proximate to the bottom surface; a lid for removable attachment to the container and covering the opening; and a closure for removable covering attachment to the container and covering the dispensing orifice.

2. A canister as defined in claim 1, wherein at least a portion of the container proximate to the measuring dispensing compartment is formed of a visually translucent material.

3. A canister as defined in claim 2, further comprising volumetric indicia disposed on the container proximate to the portion of the measuring dispensing compartment formed of a visually translucent material.

4. A canister as defined in claim 1, wherein the container defines a handle portion.

5. A canister as defined in claim 4, wherein the handle portion includes an indented portion disposed proximate to the storage compartment.

6. A canister as defined in claim 1, wherein the container and the lid are each formed of a resilient material whereby the lid can be removably attached to the container as a snap-together type attachment.

7. A canister as defined in claim 1, wherein the container includes a first threaded portion generally surrounding the dispensing orifice and the closure includes a second threaded portion capable of threaded engagement with the first threaded portion whereby the closure can be removably attached in threaded engagement to the container.

8. A canister as defined in claim 1, wherein the closure includes a first snap-on portion and the container includes a second snap-on portion generally surrounding the dispensing orifice and capable of snap-on engagement with the first snap-on portion, whereby the closure can be removably attached in snap-on engagement to the container.

9. A canister for dispensing a measured volume of the material, comprising: a container having a generally planar bottom surface, a pair of generally opposing sides, and two adjacent wall portions disposed adjacent to each other and generally normal to the bottom surface defining a partition of the container extending between the pair of generally opposing sides dividing the container into a storage compartment and a measuring dispensing compartment, the partition having an upper margin within the container so that a passage is defined generally above and between the storage compartment and the measuring dispensing compartment, the storage compartment defining an opening disposed generally opposing the bottom surface, and the measuring dispensing compartment, including volumetric indicia and defining a dispensing orifice disposed generally proximate to the bottom surface, at least a portion of the container proximate to the measuring dispensing compartment formed of a visually translucent material; a lid for removable covering attachment to the container at the opening; and a closure for removable covering attachment to the container at the dispensing orifice.

10. A canister as defined in claim 9, wherein the handle portion includes an indented portion disposed proximate to the storage compartment.

11. A canister as defined in claim 9, wherein the container and the lid are each formed of a resilient material whereby the lid can be removably attached to the container as a snap-together type attachment.

12. A canister as defined in claim 9, wherein the container includes a first threaded portion generally surrounding the dispensing orifice and the closure includes a second threaded portion capable of threaded engagement with the first threaded portion, whereby the closure can be removably attached in threaded engagement to the container.

13. A canister as defined in claim 9, wherein the closure includes a first snap-on portion and the container includes a second snap-on portion generally surrounding the dispensing orifice and capable of snap-on engagement with the first snap-on portion, whereby the closure can be removably attached in snap-on engagement to the container.

* * * * *